: US011290359B2

(12) United States Patent
Shkolnikov et al.

(10) Patent No.: US 11,290,359 B2
(45) Date of Patent: Mar. 29, 2022

(54) RELAYING INTERNET CENSUS INFORMATION

(71) Applicant: Google LLC, Mountain View, CA (US)

(72) Inventors: Zinovy Shkolnikov, Palo Alto, CA (US); Rohit Makhija, Mountain View, CA (US); Baljeet Singh, San Francisco, CA (US); Andy Stack, Palo Alto, CA (US); John Callaway, San Francisco, CA (US); Eric Mayers, San Francisco, CA (US); Mark Yoshitake, Paris (FR)

(73) Assignee: Google LLC, Mountain View, CA (US)

( * ) Notice: Subject to any disclaimer, the term of this patent is extended or adjusted under 35 U.S.C. 154(b) by 9 days.

(21) Appl. No.: 16/049,577

(22) Filed: Jul. 30, 2018

(65) Prior Publication Data
US 2018/0337844 A1    Nov. 22, 2018

Related U.S. Application Data

(63) Continuation of application No. 13/973,909, filed on Aug. 22, 2013, now Pat. No. 10,038,613.
(Continued)

(51) Int. Cl.
*H04L 12/26* (2006.01)
*H04L 43/0876* (2022.01)
*H04L 41/5067* (2022.01)

(52) U.S. Cl.
CPC ...... *H04L 43/0876* (2013.01); *H04L 41/5067* (2013.01)

(58) Field of Classification Search
CPC .......... H04L 43/0876; H04L 41/5067
(Continued)

(56) References Cited

U.S. PATENT DOCUMENTS

| 7,970,946 B1 | 6/2011 | Djabarov et al. |
| 2002/0044659 A1* | 4/2002 | Ohta .......... H04H 20/14 380/241 |

(Continued)

OTHER PUBLICATIONS

Karbasfrooshan, A., "Youtube And Comscore Partnership Ushers in New Golden Era For Online Video," Media Post, Aug. 22, 2011, 3 Pages, [online] [Retrieved on Dec. 6, 2013] Retrieved from the internet <URL:http://www.mediapost.com/publications/article/156360/>.

(Continued)

*Primary Examiner* — Kevin S Mai
(74) *Attorney, Agent, or Firm* — Lowenstein Sandler LLP

(57) ABSTRACT

A method for verifying video statistics of a content hosting platform includes enrolling, by a measurement service, a client device as a panel client device to provide panel reports independent of the content hosting platform, and sending a panel sniffer module to the panel client device. The panel sniffer module to cause the panel client device to send panel reports to the measurement service, and the panel reports include first video statistics of playback of a video by a player executing on the panel client device. The method also includes receiving a panel report from the panel client device and receiving a measurement report from the content hosting platform. The measurement report is generated by the content hosting platform and includes second video statistics of the playback. The method also includes verifying accuracy of the second video statistics by comparing the first video statistics to the second video statistics.

20 Claims, 4 Drawing Sheets

Related U.S. Application Data

(60) Provisional application No. 61/692,192, filed on Aug. 22, 2012.

(58) Field of Classification Search
USPC .......................................................... 709/224
See application file for complete search history.

(56) References Cited

U.S. PATENT DOCUMENTS

| | | | |
|---|---|---|---|
| 2003/0046032 A1* | 3/2003 | Puthiyedath | H04L 29/06027 |
| | | | 702/188 |
| 2003/0167180 A1* | 9/2003 | Chung | G06Q 10/10 |
| | | | 705/317 |
| 2008/0102947 A1 | 5/2008 | Hays et al. | |
| 2009/0083417 A1* | 3/2009 | Hughes | G06F 15/16 |
| | | | 709/224 |
| 2009/0204615 A1 | 8/2009 | Samame et al. | |
| 2013/0132170 A1* | 5/2013 | Yelisetti | G06Q 30/02 |
| | | | 705/14.4 |
| 2013/0282493 A1 | 10/2013 | Lita et al. | |

OTHER PUBLICATIONS

Vranica, S., "Google Relents on YouTube Ad Measurement," The Wall Street Journal, Nov. 11, 2013, 4 Pages, [online] [Retrieved on Dec. 6, 2013] Retrieved from the internet <URL:http://online.wsj.com/news/articles/SB10001424052702303914304579192211449903486>.

* cited by examiner

RELAYING INTERNET CENSUS INFORMATION

CROSS-REFERENCE TO RELATED APPLICATION

This continuation application claims priority to U.S. patent application Ser. No. 13/973,909 filed on Aug. 22, 2013, which claims the benefit of U.S. Provisional Application No. 61/692,192, filed Aug. 22, 2012, which are incorporated herein by reference.

BACKGROUND

1. Field of Art

The present invention relates to collecting and reporting census information describing use of network-based services.

2. Background of the Invention

Peoples' activities on the Internet are measured in order to support market research, advertising budget planning and effectiveness measurements, and the like. Activities measured may span across contexts including media consumption, device usage and user engagements. Activities that may be measured include web page visits, video views, mobile or web application usage and actions performed within these and other contexts. A company may measure such activities of its own users, or employ independent measurement agencies to report activities on its websites, mobile applications, video players, etc. Independent measurement agencies may have expertise in measuring such activity across multiple content platforms and device types, and also in determining demographics of users consuming or engaging with the content and devices. These measurements may be done as one-off custom measurement tasks or cross-industry measurements, and such measurement may lead to analysis that is intended for consumption by a selective audience or for syndication publicly.

For specific purposes like advertising planning or effectiveness measurements, advertising companies may wish to compare industry-wide demographics-based statistics published by such independent measurement agencies. These measurement agencies provide a standard methodology for making measurements across multiple web properties and analyzing the measurements across varying demographic groups. The standard methodology allows for different user activities on the Internet to be compared on an equal basis.

One technique used by measurement agencies is to hire users as dedicated panelists. The panelists agree to let the measurement agencies track their Internet activities in return for payments or other benefits. The panelists run panel software that executes on their clients and report their activities to the agencies' servers. However, this technique does not scale well as it only measures the activities of a few users and measurement agencies must statistically predict the demographics and activities of the rest of the Internet population. Moreover, the measurement agency may make incorrect measurements and draw inaccurate conclusions thus misinforming the market.

By working with the content and/or device companies, measurement agencies may increase the accuracy of their measurements and the implications of their analyses. In such collaborations, a common technique used by the measurement agencies relies on tracking pixels to measure the entire population interacting with the hosted content (web site, video or application). In this technique, an application (e.g., a web site or video player) embeds a reference to a small tracking pixel on a web page. When a user's client loads the web page, the client requests the tracking pixel from a server operated by a measurement agency. The measurement agency obtains information about the client (and the user) from the request. By aggregating these requests, the measurement agency generates measurements and conducts analyses on the usage and interaction of Internet users with the specific application or content.

A problem with measurement systems, especially those that utilize tracking pixels, is that the systems expose information about the users to the measurement agencies. If multiple sites subscribe to such tracking pixels, measurement agencies could potentially track user activities across multiple sites and applications on the Internet, without user consent. The request for the tracking pixel exposes the Internet Protocol (IP) address of the client, a cookie stored at the client, and/or other information about the client or user to the measurement agency. Users may desire to avoid exposing this information to measurement agencies but often do not have control over such measurement techniques implemented across various web sites and applications across the Internet. Moreover if users were to disable such measurements, it would negatively impact the quality of measurements made by the measurement agencies.

Another problem with tracking pixel is that they do not scale well. A single web property might support multiple measurement agencies. If each agency includes a tracking pixel, a user's client might need to request, say, 15 different tracking pixels from 15 different servers. The tracking pixels thus add undesirable processing and network overhead to a user's Internet-based activities.

SUMMARY

Embodiments of the present disclosure provide a method, non-transitory computer-readable storage medium, and system for providing measurement information. One aspect of the method comprises receiving a plurality of census events from a plurality of clients used by a plurality of users via a network, the census events describing usage of a network-based service by the clients. The method further comprises processing the plurality of census events to produce measurement reports describing the usage of the network-based service, the processing including filtering specified information out of the census reports to prevent the measurement reports from identifying the users of the clients. The method additionally comprises providing the measurement reports to a measurement agency via the network.

An embodiment of the non-transitory computer-readable storage medium stores executable computer program instructions for providing measurement information. The computer program instructions comprise instructions for receiving a plurality of census events from a plurality of clients used by a plurality of users via a network, the census events describing usage of a network-based service by the clients. The computer program instructions further comprise instructions for processing the plurality of census events to produce measurement reports describing the usage of the network-based service, the processing including filtering specified information out of the census events to prevent the measurement reports from identifying the users of the clients. The computer program instructions additionally comprise instructions for providing the measurement reports to a measurement agency via the network.

An embodiment of the computer system for providing measurement information comprises a non-transitory computer readable storage medium storing executable program code. The executable program code comprises code for receiving a plurality of census events from a plurality of clients used by a plurality of users via a network, the census events describing usage of a network-based service by the clients. The executable program code further comprises code for processing the plurality of census events to produce measurement reports describing the usage of the network-based service, the processing including filtering specified information out of the census events to prevent the measurement reports from identifying the users of the clients. The executable program code additionally comprises code for providing the measurement reports to a measurement agency via the network. The computer system also comprises a processor for executing the program code.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict one embodiment for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
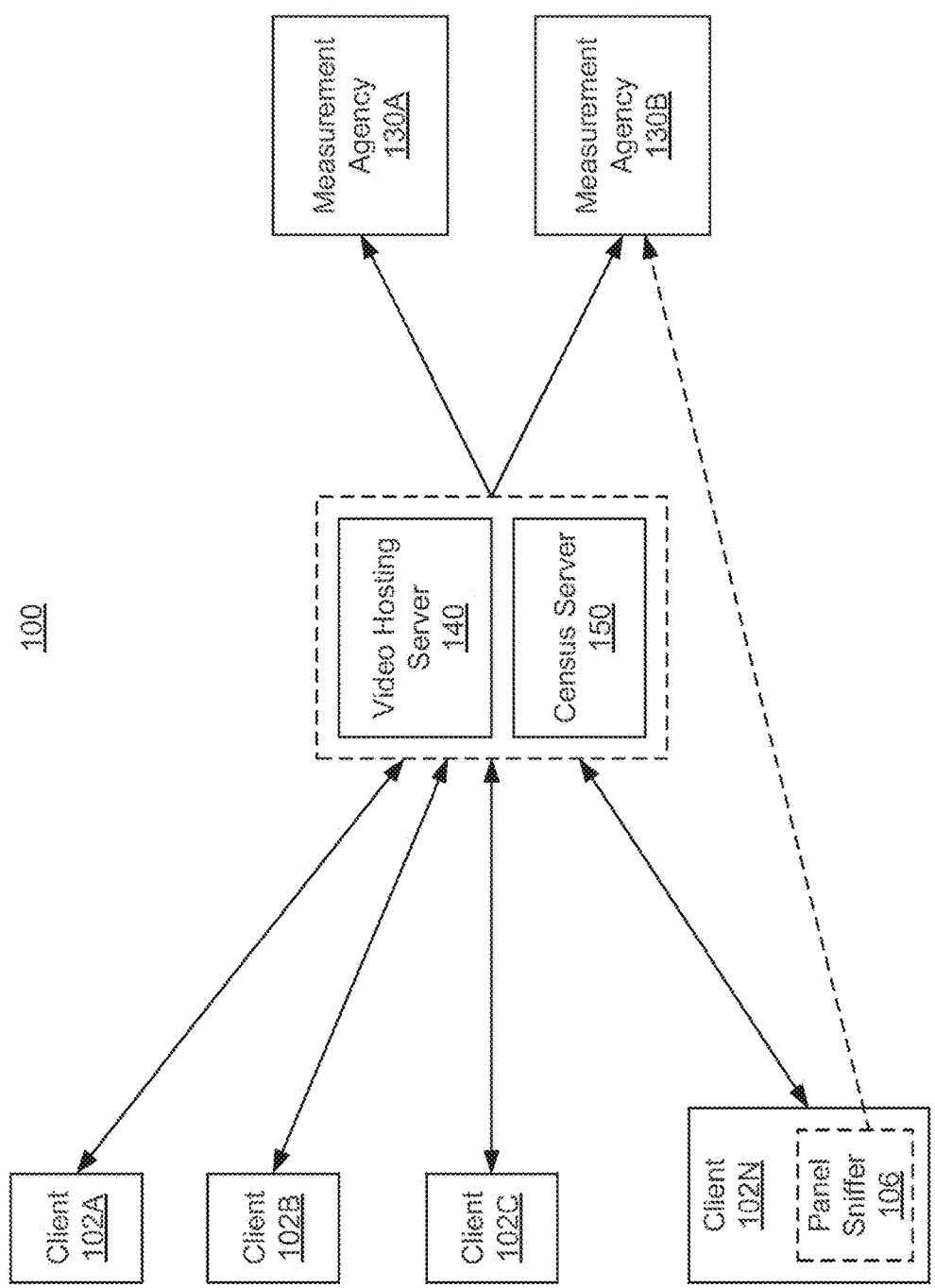
FIG. 1 is a high-level block diagram of a network environment for reporting census information to measurement agencies according to one embodiment.

FIG. 1 is a high-level block diagram of a network environment 100 for reporting census information to measurement agencies according to one embodiment. The network environment includes multiple clients (labeled 102A-N) and measurement agencies (labeled 103A-B), a video hosting server 140, and a census server 150 interconnected by a network 120 (not shown in FIG. 1). Other embodiments may include additional and/or different entities, and may include multiple servers 140 and 150. In general, functions described in one embodiment as being performed on the server side can also be performed on the client side in other embodiments if appropriate.

The clients 102 are electronic devices used by users to interact with the video hosting server 140 and/or other entities on the network. For example, a client 102 may be a desktop, notebook, or tablet computer, a mobile telephone, a video game system, or television set-top box. A client 102 may execute applications that enable it to interact with the video hosting server 140, such as a general purpose web browser or a dedicated application. The browser itself may have functionality for executing computer program instructions. For example, the browser may include functionality for executing code downloaded from the video hosting server 140 within an environment provided by the browser.

In one embodiment, a user uses a client 102 to access and view videos hosted by the video hosting server 140. To this end, the client 102 requests a video from the video hosting server 140, receives the video, and plays the video at the client. Users may also use clients 102 to use network-based services that are not related to videos. While this description often refers to video-related services, the techniques described herein may be used with measurement of any user activity on a network-based service and are not limited to the video domain.

The clients 102 send census events to the census server 150 upon the occurrence of certain events, such as accessing specified network-based services. In one embodiment, the clients 102 receive instructions from the census server 150 indicating when to and where to send the census events. A census event includes information about the user, client, and/or event. For example, a client 102 may send a census event when a video is played at the client. The census event thus indicates that the video was played at the client 102, and may also serve to indicate that the user of the client watched at least a portion of the played video.

In addition, some of the clients 102N are used by users who are enrolled by measurement agencies 130 as panelists. These panel clients 102N execute specialized software, such as a panel sniffer module 106, received from the measurement agencies 130 that send panel reports to the measurement agencies. The panel reports describe events occurring on the panel clients 102N, and may include some of the same information contained in census events. In FIG. 1, client 102N is a panel client, and the panel report is indicated by the dashed line from this client to the measurement agency 130B. In general, the entity operating the video 140 and census 150 servers does not know which clients are panel clients, and the same client 102 may send a census event to the census server 150 and a panel report to a measurement agency 130.

The video hosting server 140 performs a variety of functions including hosting videos and providing the videos to the clients 102, while the census server 150 receives census events from the clients, and provides measurement reports to the measurement agencies 130. Both the video hosting server 140 and the census server 150 may be operated by the same entity, for example, the entity provides the content hosting. Hence, the video hosting 140 and census 150 servers are surrounded by a dashed line in FIG. 1. Although illustrated in FIG. 1 as separate servers, the video hosting server 140 and the census server 150 may be combined. The video hosting server 140 and census server 150 can also be formed of multiple servers. For example, the video hosting and census functions may be divided among different sets of servers.

In one embodiment, the video hosting server 140 hosts multiple videos that can be viewed at the clients 102. The videos may be uploaded by users of the clients 102 and/or from other sources. The video hosting server 140 also provides functionality for searching and playing the videos. Further, an embodiment of the video hosting server 140 provides a player module to clients 102 that the clients execute in order to play the videos. The player module causes the clients 102 to provide the census events to the census server 150 upon occurrences of the specified events.

The census server 150 processes the census events received from the clients. This processing may remove information from the reports, add information to the reports, and/or make other modifications to the reports. This processing produces the measurement reports. The census server 150 provides the measurement reports to the measurement agencies 130.

In situations in which the census server 150 or other entities discussed here collect personal information about users, or may make use of personal information, the users may be provided with an opportunity to control whether the described programs or features collect user information. In addition, certain data may be treated in one or more ways before it is stored or used, so that personally identifiable information is removed. For example, a user's identity may be treated so that no personally identifiable information can be determined for the user, or a user's geographic location or network address may be generalized so that a particular location of a user cannot be determined. Thus, the user may have control over how information is collected about the user and used by the census server 150.

The measurement agencies 130 receive the measurement reports from the census server 150. In one embodiment, the measurement agencies 130 operate computers on the Internet that receive the reports electronically. The measurement agencies 130, in turn, may use the measurement reports to produce their own aggregated summaries and analyses describing usage of the video hosting server 140 by the clients 102. For example, the reports from the measurement agencies 130 may describe how the clients tend to access and use the video hosting server 140. In addition, the measurement agencies may correlate the measurement reports with panel reports received from their panelists in order to verify the reports. In one embodiment, the measurement agencies 130 are third parties not affiliated with the entity operating the video hosting server 140 and the census server 150.

Figure 2:
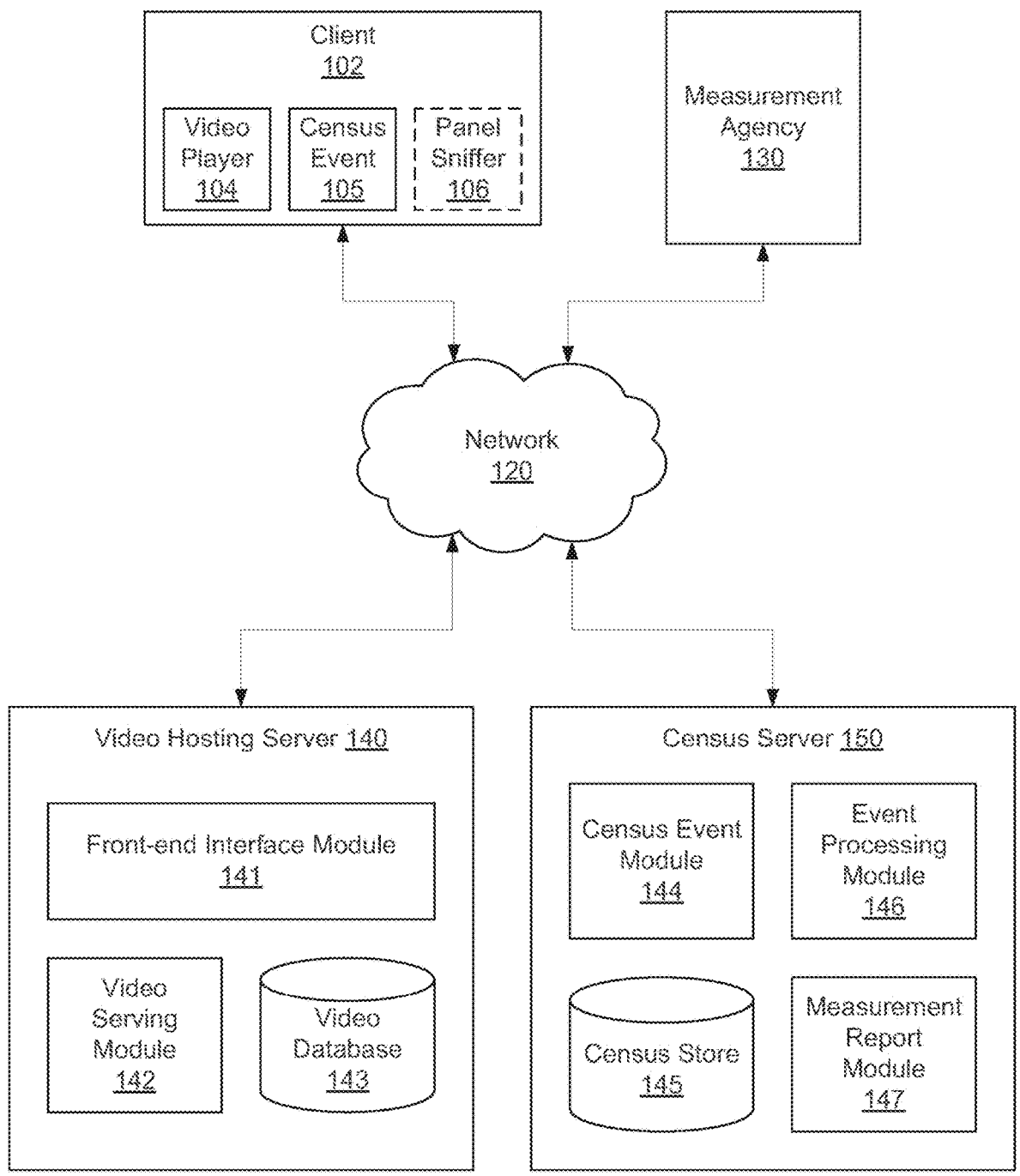
FIG. 2 illustrates another view of the environment of FIG. 1 including more details of the client, video hosting server, and census server.

FIG. 2 illustrates another view 200 of the environment of FIG. 1 including more details of the client 102, video hosting server 140, and census server 150. FIG. 2 illustrates a client 102 and a measurement agency 130 connected to the video hosting server 140 and the census server 150 by a network 120. In addition, FIG. 2 illustrates computer program modules within the client 102, video hosting server 140, and census server 150. Other embodiments may have different and/or different modules than illustrated herein. Moreover, functions may be distributed among the modules in different ways.

The video hosting server 140 includes a front-end interface module 141. The front-end interface 141 provides functionality allowing the client 102 to access the features of the video hosting server 140. In one embodiment, the front-end interface 141 provides a web site that the client 102 can visit to view videos and perform related functions. For example, the front-end interface 141 may provide the YOUTUBE web site. Note that the video hosting server 140 is shown to ensure clarity and illustrate the embodiment where video serving and census measurement are provided. Other embodiments may also have the server 140 hosting other content, such as web pages or applications.

A video database 143 stores videos served by the video hosting server 140. In one embodiment, a user of the client 102 can use the front-end interface 141 to search the video database 143 for videos of interest. The videos in the video database each have a video identifier (ID) that uniquely identifies each video. In addition, the videos are organized by "channel." The channel identifies the user or other entity that provided the video. For example, a user may have an associated channel that contains all of the videos uploaded and/or owned by the user. Some users, referred to as "content owners," can have more than one associated channel.

A video serving module 142 serves videos from the video database 143 to clients 102. As mentioned earlier, in one embodiment the video serving module 142 also provides a video player 104 to the client 102. The client 102 executes the video player module 104, which causes the video to play at the client. The video player 104 is instrumented to cause the client 102 generate one or more census events 105 upon the occurrence of specified events. In other embodiments, the client 102 obtains the video player 104 from entities other than the video hosting server 140, such as from an application repository.

In one embodiment, the video player 104 causes the client 102 to generate a census event upon initiating the playing of the video (e.g., at the zero second mark at the beginning of the video). Other embodiments may cause the client 102 to generate census events 105 at different and/or additional times, such as during or after the playing of the video or accessing another network-based service provided by the video hosting server 140. In addition, the video player 104 causes the client 102 to send the census event to the census server 150 via the network 120. For example, the client 102 may send the census event by making a hypertext transport protocol (HTTP) GET request to a specified address associated with the census server 150. The GET request contains a uniform resource locator (URL) with embedded information containing the content of the census event 105. In addition, the client 102 may be enrolled by a measurement agency 130 as a panelist, and thus optionally includes a panel sniffer module 106 received from the measurement agency 130. The panel sniffer module 106 detects GET URLs from census events 105 and sends panel reports describing the census events to a measurement agency 130.

A census event module 144 at the census server 150 receives the census events 105 from the clients 102 and stores the events in a census store 145. The census store 145 is a database for storing the events and associated information. The information in a census event 105 may include the video ID identifying the video being played, a playback ID uniquely identifying the video playback instance, a channel name identifying the channel with which the video is associated, and a content owner ID identifying the owner of the content. In addition, the census event 105 includes additional information transmitted as part of the HTTP GET request, including the client Internet Protocol (IP) address, the user agent string, and a cookie stored by the client 102 on behalf of the video hosting server 140.

An event processing module 146 processes the census events in the census store 145 to produce server-side census events, i.e., measurement reports. In one embodiment, the event processing module 146 processes each census event into a distinct measurement report. In another embodiment, the event processing module 146 combines multiple census events into a single measurement report. The event processing module 146 may store the measurement reports in the census store 145 or another database.

The event processing module 146 processes the census events to leave certain information intact while filtering out (e.g., removing and/or obfuscating) information that could be used to personally identify the user or identify a video watched by the user. In one embodiment, the event processing module 146 does not filter out the identifiers of the user agent, content owner, channel, or playback instance. Thus, this information passes from a census event to the corresponding measurement report.

The event processing module 146, however, does filter out the client cookie, the client IP address, and the ID of the watched video. In one embodiment, the event processing module 146 filters the cookie by hashing the cookie and including the resulting hash in the measurement report. This technique allows measurement reports from the same client to be correlated using the cookie, without exposing the cookie itself.

The event processing module 146 may filter the client IP address by removing the last quartet of the address from the measurement report. Further, an embodiment of the event processing module 146 tracks how many IP addresses within a specified address range are used by the clients 102 (i.e., included in census events from the clients) within a specified time period. If at least a threshold number of IP addresses are used, the IP address range is placed on a whitelist and the IP address, absent the last quartet, is included in the measurement report. The IP address is included in the report because the IP address cannot be tracked back to a single client due to there being at least the threshold number of IP addresses used in the address range. If an IP address in a census event received from a client is not within an address range on the whitelist, an embodiment of the event processing module 146 filters the IP address by not including it in the measurement report because the address could possibly be tracked back to a single client. Other embodiments of the event processing module 146 may filter out the client IP address completely and only provide high level geographic details of the clients to varying degrees that may include one or more of, country, state, city, while similarly using threshold numbers of IP addresses per level of geography exposed, in order to sufficiently aggregate and obscure individual clients.

Different embodiments of the event processing module 146 can process reports in different manners, and filter different types of information. For example, the event processing module 146 may provide more information about the specific content consumed or engaged (in this case a video watched) and less information identifying the user or client that watched the video. Such an event may identify the watched video but ensure that the user/client is not identifiable. In addition, the event processing module 146 and/or other modules in the server can analyze the events to generate internal metrics describing how the video hosting server 140 is used by the clients 102. The event processing module 146 may also customize the information in the measurement reports to improve the quality of the data. For example, the event processing module 146 can adjust the reported content owner IDs to account for attributes of the content, like video categories and complex ownership data (e.g., shared ownerships across multiple content owners).

The measurement report module 147 sends the measurement reports to the measurement agency 130 via the network. In one embodiment, the measurement agency 130 contracts with the entity operating the census server 150 to receive the measurement reports. The measurement report module 147 may customize the content of the measurement reports sent to the measurement agency 130 depending upon the agreement with the agency. For example, the measurement report module 147 may send reports for only certain content owners, types of videos, geographic regions, etc. and may send varying level of granularity or varying types of data to different measurement agencies, as appropriate per their contracts.

In one embodiment, the measurement report module 147 transmits the measurement reports to the measurement agency 130 using a persistent network connection. For example, the measurement report module 147 may maintain a persistent HTTP connection between the census server 150 and the computer operated by the measurement agency 130. Such a connection sends the measurement reports over a persistent Transmission Control Protocol (TCP) connection, keeping the TCP connection open for subsequent reports. This technique is more efficient than opening a new connection for each measurement report.

In addition, the measurement report module 147 may use rate limiting, backlogging, or other techniques to control the flow of measurement reports to the measurement agency 130. For example, the measurement report module 147 may use rate limiting to limit the rate that the measurement reports are sent to the measurement agency 130 to comply with network bandwidth or data processing restrictions. Similarly, the measurement report module 147 can use backlogging to buffer the measurement reports, and send batched reports to the measurement agency 130 at an appropriate time. Such techniques might be used, for example, if the measurement agency 130 computer system is offline or otherwise temporarily not available to receive measurement reports. The batched reports may also be used for better scalability or easier data transfer between the census server 150 and measurement agencies.

Figure 3:
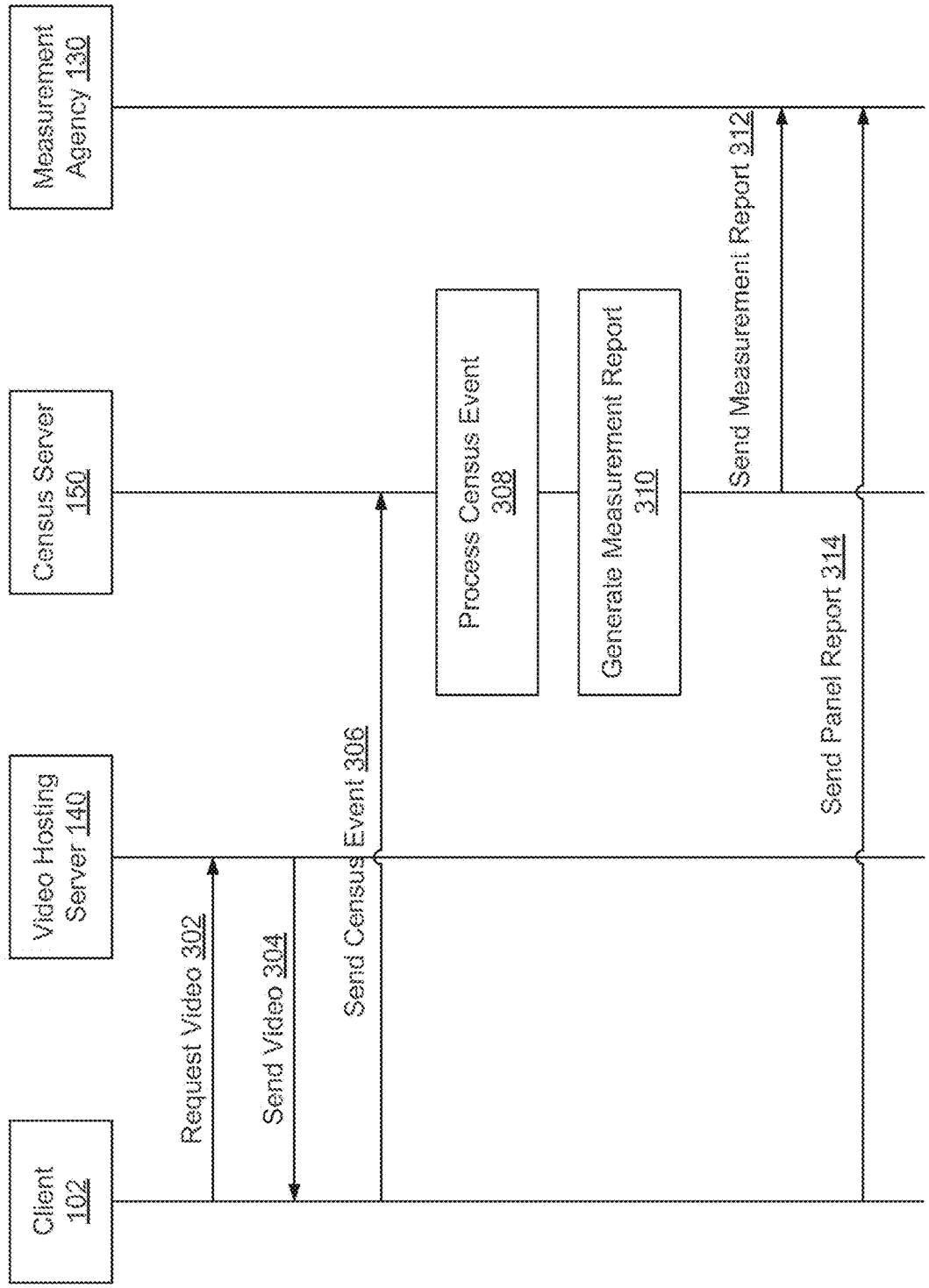
FIG. 3 is a transaction diagram illustrating a method of providing census information to a measurement agency according to one embodiment.

FIG. 3 is a transaction diagram illustrating a method of providing census information to a measurement agency according to one embodiment. The various entities are illustrated in boxes along the top of the figure, and time is represented by vertical lines descending from the boxes. Interactions between the entities are represented by horizontal lines. Other embodiments of the method may include different entities, perform the transactions in different orders, and/or perform different interactions. Likewise, the functions described herein may be performed by other entities in other embodiments.

As shown in FIG. 3, the client 102 sends 302 a request for a video to the video hosting server 140. The video hosting server 140, in turn, receives the request and provides 304 the requested video to the client 102. As part of this transaction, the video hosting server 140 may also send a player to the client 102. The player is configured to execute at the client 102 to play the video, and also to send census events upon the occurrence of specified events at the client.

Upon the occurrence of a specified event, such as initiating playback of the video, the client 102 sends 306 a census event describing the event to the census server 150. As mentioned above, the census event may include, for example, information such as an ID of the video being played, a playback ID identifying the playback instance, an ID of the channel associated with the video, and an ID of the content owner for the video, as well as information about the client 102.

The census server 150 subsequently processes 308 the census event received from the client 102. For example, the census server 150 may filter certain information out of the census event to prevent identification of the user or client 102 associated with the event. This processing generates 310 a measurement report. The census server 150 sends 312 the measurement report to the measurement agency 130. In case that the client 102 is a panel member of the measurement agency 130, the client 102 may also send 314 a panel report directly to the measurement agency. The measurement agency can thus verify the quality of the numerous measurement reports they receive from the census server, by independently examining sample data from their own panelists, and maintain confidence in the census data they receive, just as if they had been managing the census server themselves. While FIG. 3 describes the census and measurement reports in the context of a single client 102, and a single measurement agency 130, embodiments may simultaneously process multiple census events from multiple clients, and likewise provide multiple measurement reports to multiple measurement agencies.

Figure 4:
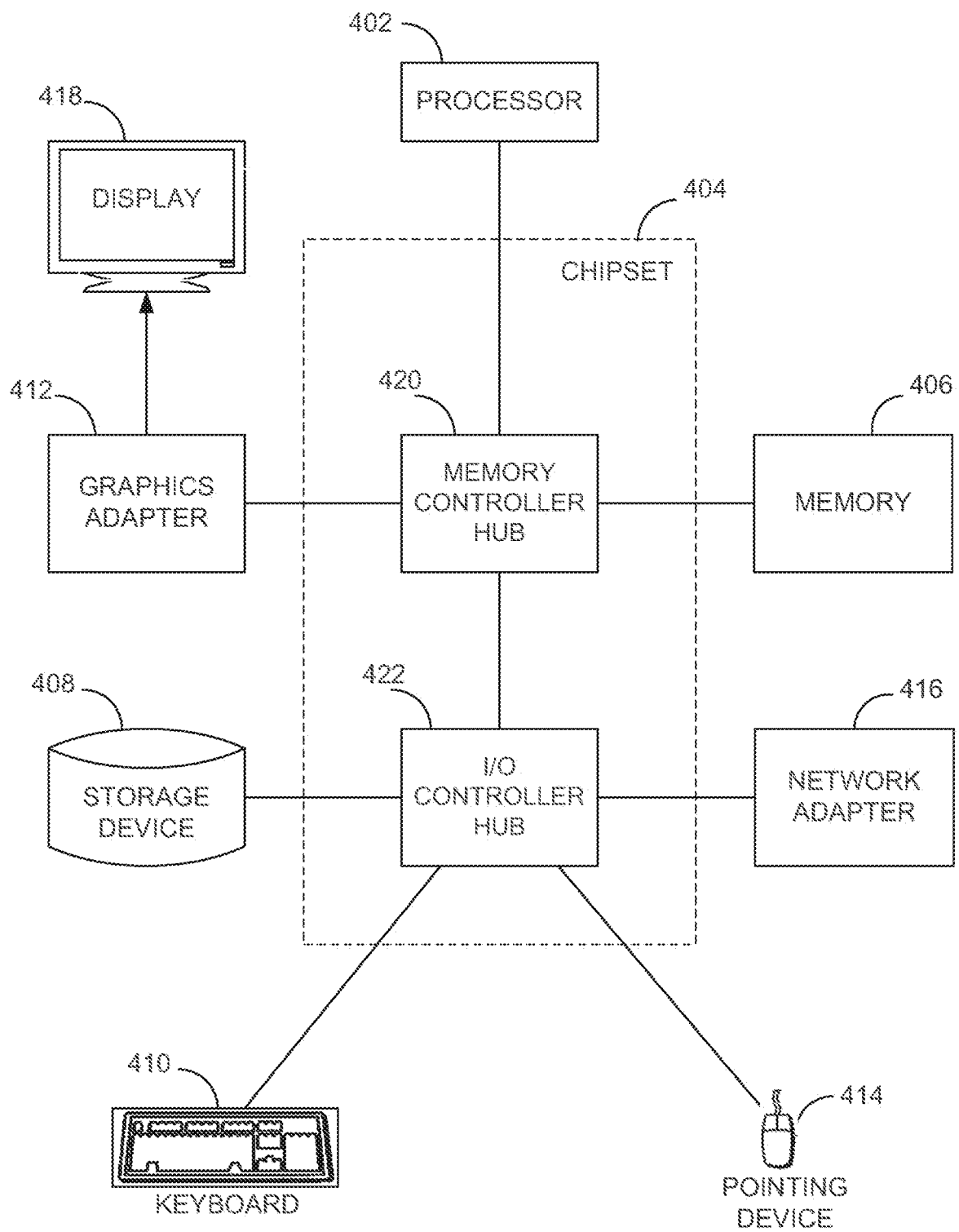
FIG. 4 is a high-level block diagram of a computer for use as the server, the measurement agency servers, and/or clients in the network environment shown in FIG. 1.

FIG. 4 is a high-level block diagram of a computer 400 for use as the video hosting server 140 and the census server 150, the measurement agency servers 130, and/or clients 102 in the network environment 100 shown in FIG. 1. In addition, the computer 400 may be used to implement one or both of the illustrated databases 143, 145. Illustrated are at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display device 418 is coupled to the graphics adapter 412. A storage device 408, keyboard 410, pointing device 414, and network adapter 416 are coupled to the I/O controller hub 422. Other embodiments of the computer 400 have different architectures. For example, the memory 406 is directly coupled to the processor 402 in some embodiments.

The storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, or other type of pointing device, and is used in combination with the keyboard 410 to input data into the computer 400. The graphics adapter 412 displays images and other information on the display device 418. The network adapter 416 couples the computer 400 to the network 120.

The computer 400 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 408, loaded into the memory 406, and executed by the processor 402.

Some embodiments of the computer 400 have different and/or other components than those shown in FIG. 4 depending upon the embodiment and the desired processing power. For example, a computer acting as the server 140 may comprise multiple blade servers working together and lack components such as a keyboard 410, graphics adapter 412, and display 418.

Reference in the specification to "one embodiment" or to "an embodiment" means that a particular feature, structure, or characteristic is included in at least one embodiment of the invention. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for verifying video statistics of a content hosting platform, the method comprising:
enrolling, by a measurement service, a client device as a panel client device of a plurality of panel client devices, wherein each of the plurality of panel client devices is to provide one or more panel reports independent of the content hosting platform;

sending, from the measurement service, a panel sniffer module to the panel client device, wherein the panel sniffer module is to cause the panel client device to send one or more panel reports to the measurement service in response to one or more videos associated with a particular video type playing at the panel client device;

responsive to a video associated with the particular video type playing via a player executing on the panel client device, receiving, at the measurement service, a panel report from the panel client device, wherein the panel report comprises first video statistics generated for a playback of the video, wherein the first video statistics are generated based on at least one of a video identifier identifying the video, a playback identifier identifying a playback instance of the video, a channel identifier identifying a channel associated with the video, or a content owner identifier identifying an owner of the video;

receiving a measurement report from the content hosting platform, wherein the measurement report is generated by the content hosting platform based on one or more census events received from a plurality of client devices that played the video associated with the particular video type, wherein the plurality of client devices comprises the panel client device, and wherein the measurement report comprises second video statistics generated for the playback of the video on each of the plurality of client devices; and verifying an accuracy of the second video statistics included in the measurement report by comparing the second video statistics to a set of video statistics, wherein the set of video statistics comprises one or more video statistics included in panel reports received from each of the plurality of panel client devices, the one or more video statistics comprising the first video statistics generated for the playback of the video executing on the panel client device.

2. The method of claim 1, further comprising:
receiving, at the measurement service, a plurality of measurement reports from the content hosting platform, wherein the plurality of measurement reports are generated by the content hosting platform and include a plurality of video statistics related to a playback of a plurality of videos by a plurality of players executing on the plurality of client devices; and
producing, using the plurality of measurements reports, an aggregated summary describing usage of the content hosting platform by the plurality of client devices.

3. The method of claim 1, wherein the first video statistics of the panel report does not include information that identifies an identity of a user of the panel client device or does not include information that identifies a location of the user of the panel client device.

4. The method of claim 1, wherein the second videos statistics of the measurement report does not include information that identifies an identity of a user of the panel client device or does not include information that identifies a location of the user of the panel client device.

5. The method of claim 1, wherein the measurement report is received by the measurement service from the content hosting platform via a persistent network connection, wherein the persistent network connection is kept open for subsequent measurement reports.

6. The method of claim 1, wherein the panel sniffer module is to detect GET uniform resource locators (URLs) associated with the playback of the video associated with the particular video type by the player executing on the panel client device.

7. The method of claim 1, wherein measurement reports are received by the measurement service from the content hosting platform at a rate that complies with network bandwidth or data processing restrictions.

8. The method of claim 1, wherein measurement reports are received by the measurement service from the content hosting platform in batches.

9. The method of claim 1, wherein the measurement service is hosted by a third party that is different from an entity hosting the content hosting platform.

10. A non-transitory computer-readable storage medium storing executable computer program instructions for verifying video statistics of a content hosting platform, the computer program instructions, when executed by a processing device, cause the processing device to:
enroll, by a measurement service, a client device as a panel client device of a plurality of panel client devices, wherein each of the plurality of panel client devices is to provide one or more panel reports independent of the content hosting platform;
send, from the measurement service, a panel sniffer module to the panel client device, wherein the panel sniffer module is to cause the panel client device to send one or more panel reports to the measurement service in response to one or more videos associated with a particular video type playing at the panel client device;
responsive to a video associated with the particular video type playing via a player executing on the panel client device, receive, at the measurement service, a panel report from the panel client device, wherein the panel report comprises first video statistics generated for a playback of the video, wherein the first video statistics are generated based on at least one of a video identifier identifying the video, a playback identifier identifying a playback instance of the video, a channel identifier identifying a channel associated with the video, or a content owner identifier identifying an owner of the video;
receive a measurement report from the content hosting platform, wherein the measurement report is generated by the content hosting platform based on one or more census events received from a plurality of client devices that played the video associated with the particular video type, wherein the plurality of client devices comprises the panel client device, and wherein the measurement report comprises second video statistics generated based on the playback of the video on each of the plurality of client devices; and
verify an accuracy of the second video statistics included in the measurement report by comparing the second video statistics to a set of video statistics, wherein the set of video statistics comprises one or more video statistics included in panel reports received from each of the plurality of panel client devices, the one or more video statistics comprising the first video statistics generated for the playback of the video executing on the panel client device.

11. The computer-readable storage medium of claim 10, wherein the processing device is further to:
receive, at the measurement service, a plurality of measurement reports from the content hosting platform, wherein the plurality of measurement reports are generated by the content hosting platform and include a plurality of video statistics related to a playback of a plurality of videos by a plurality of players executing on the plurality of client devices; and produce, using the plurality of measurements reports, an aggregated summary describing usage of the content hosting platform by the plurality of client devices.

12. The computer-readable storage medium of claim 10, wherein the first video statistics of the panel report does not include information that identifies an identity of a user of the panel client device or does not include information that identifies a location of the user of the panel client device.

13. The computer-readable storage medium of claim 10, wherein the second videos statistics of the measurement report does not include information that identifies an identity of a user of the panel client device or does not include information that identifies a location of the user of the panel client device.

14. The computer-readable storage medium of claim 10, wherein the measurement report is received by the measurement service from the content hosting platform via a persistent network connection, wherein the persistent network connection is kept open for subsequent measurement reports.

15. The computer-readable storage medium of claim 10, wherein the panel sniffer module is to detect GET uniform resource locators (URLs) associated with the playback of the video associated with the particular video type by the player executing on the panel client device.

16. The computer-readable storage medium of claim 10, wherein the measurement service is hosted by a third party that is different from an entity hosting the content hosting platform.

17. A system for verifying video statistics of a content hosting platform comprising:

a storage device; and a processor communicatively coupled to the storage device, wherein the processor is to execute a measurement service to:

enroll a client device as a panel client device of a plurality of panel client devices, wherein each of the plurality of panel client devices is to provide one or more panel reports independent of the content hosting platform;

send a panel sniffer module to the panel client device, wherein the panel sniffer module is to cause the panel client device to send one or more panel reports to the measurement service in response to one or more videos associated with a particular video type playing at the panel client device;

responsive to a video associated with the particular video type playing via a player executing on the panel client device, receive a panel report from the panel client device, wherein the panel report comprises first video statistics generated for a playback of the video, wherein the first video statistics are generated based on at least one of a video identifier identifying the video, a playback identifier identifying a playback instance of the video, a channel identifier identifying a channel associated with the video, or a content owner identifier identifying an owner of the video;

receive a measurement report from the content hosting platform, wherein the measurement report is generated by the content hosting platform based on one or more census events received from a plurality of client devices that played the video associated with the particular video type, wherein the plurality of client devices comprises the panel client device and, wherein the measurement report comprises second video statistics generated for the playback of the video on each of the plurality of client devices; and verify an accuracy of the second video statistics included in the measurement report by comparing the second video statistics to a set of video statistics, wherein the set of video statistics comprises one or more video statistics included in panel reports received from each of the plurality of panel client devices, the one or more video statistics comprising the first video statistics generated for the playback of the video executing on the panel client device.

18. The system of claim 17, wherein the processor is further to:

receive a plurality of measurement reports from the content hosting platform, wherein the plurality of measurement reports are generated by the content hosting platform and include a plurality of video statistics related to a playback of a plurality of videos by a plurality of players executing on the plurality of client devices; and produce, using the plurality of measurements reports, an aggregated summary describing usage of the content hosting platform by the plurality of client devices.

19. The system of claim 17, wherein the first video statistics of the panel report does not include information that identifies an identity of a user of the panel client device or does not include information that identifies a location of the user of the panel client device.

20. The system of claim 17, wherein the second videos statistics of the measurement report does not include information that identifies an identity of a user of the panel client device or does not include information that identifies a location of the user of the panel client device.

* * * * *